United States Patent Office 2,728,749
Patented Dec. 27, 1955

2,728,749

FLUOROALKYL VINYL SULFONATES AND POLYMERS THEREOF

Harry W. Coover, Jr., and Joseph B. Dickey, Kingsport, Tenn., assignors to Eastman Kodak Company, Rochester, N. Y., a corporation of New Jersey No Drawing. Application April 25, 1952,
Serial No. 284,444

12 Claims. (Cl. 260—79.3)

This invention relates to fluoroalkyl vinyl sulfonates, to polymers thereof, and to processes for their preparation.

In the past, alkyl esters of vinyl sulfonic acid (alkyl ethylene sulfonates) have been polymerized alone or copolymerized with other ethylenically unsaturated compounds. Such polymers are generally soft or rubbery and not well suited for molding and fiber-forming purposes. We have now found that greatly improved molding and fiber-forming resinous materials which are insoluble in water but readily soluble in volatile organic solvents, and which also show markedly improved flame resistance, can be prepared from fluorine containing alkyl vinyl sulfonates having the general formula:

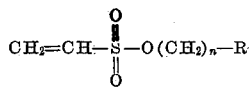

wherein $n$ represents a whole number of from 1 to 2, and R represents a member of the group consisting of a —$CHF_2$ group, a —$CF_3$ group and a —$CF_2$—$CH_3$ group. The above defined monomers are also valuable intermediates for the preparation of other useful compounds.

It is, accordingly, an object of the invention to provide monomeric fluoroalkyl vinyl sulfonates. Another object is to provide resinous polymers of such fluoroalkyl vinyl sulfonates. Another object is to provide methods for preparing the same. Other objects will become apparent hereinafter.

In accordance with the invention, we prepare our new monomeric fluoroalkyl vinyl sulfonates above defined by reacting an ethylenesulfonyl halide with the appropriate alkali metal fluoroalcoholate, preferably the sodium alcoholate, in alcohol solution, or by reacting the sulfonyl halide with a fluoroalkyl alcohol in the presence of an acid acceptor such as an alkali metal carbonate (e. g. sodium or potassium carbonate, etc.) or tertiary amines (e. g. trimethylamine, pyridine, quinoline, etc.) to take up the hydrogen halide generated. The proportions used of the reactants is not critical, an excess of one or the other being practical, but preferably equimolar quantities of the reactants are employed. The temperature is preferably held in the range of from 0 to 50° C. The fluoroalkyl vinyl sulfonate is then separated from the reaction mixture by conventional methods, preferably by fractional distillation of the mixture. Suitable intermediate monohydroxy fluoroalkyl alcohols include 2,2-difluoroethanol, 2,2,2-trifluoroethanol, 2,2-difluoropropanol, 3,3,3-trifluoropropanol and the corresponding di- and trifluorobutanols.

The polymerization of the new monomers of the invention alone or conjointly with one or more other polymerizable compounds to high molecular weight resinous polymers is accelerated by heat, by actinic light and by polymerization catalysts which are known to promote the polymerization reactions such as peroxide type including benzoyl peroxide, acetyl peroxide, lauroyl peroxide, tertiary butyl hydroperoxide, hydrogen peroxide, persulfates such as ammonium persulfate, sodium persulfate, potassium persulfate, persulfuric acid, etc., perborates such as sodium perborate and other alkali metal perborates, the water-soluble salts of percarbonic acid, the water-soluble salts of perphosphoric acid, etc. Mixtures of one or more of the catalysts can be employed. The amount of catalyst employed can vary from about 0.2 to 3.0 per cent, based on the weight of monomer to be polymerized. An activating agent such as sodium bisulfite can be used, if desired, in conjunction with the polymerization catalysts in aqueous systems. For mass polymerizations, an organic peroxide is preferred. The temperature of polymerization can vary over a wide range, but preferably the polymerizations are carried out at from about 30°–100° C. Chain regulators such as alkyl mercaptans (e. g. hexyl, octyl, lauryl, dodecyl mercaptans, etc.) can also be added with advantage to the polymerization mixtures.

The polymerizations can be carried out in mass or in dispersed form in a nonsolvent for the monomers, the particles of dispersed monomer being very small (emulsion) or relatively large (bead or granular). For dispersion polymerizations, any nonsolvent for the monomers can be employed, water being an especially suitable nonsolvent. Advantageously, an emulsifying or dispersing agent is added to the polymerization mixtures in an amount not exceeding about 3 per cent of the weight of monomers. Suitable emulsifying agents include salts of higher fatty acids (e. g. sodium or potassium stearate, palmitate, etc.)., ordinary soaps; salts of higher fatty alcohol sulfates (e. g. sodium or potassium cetyl sulfate; sodium or potassium lauryl sulfate, sodium or potassium stearyl sulfate, etc.), salts or aromatic sulfonic acids (e. g. sodium or potassium salts of alkylnaphthalene sulfonic acids, etc.), higher molecular weight quaternary ammonium salts (e. g. dimethyl benzylphenyl ammonium chloride, quaternary ammonium salts containing the radicals $C_{15}H_{31}$ and $C_{17}H_{35}$, etc.) or dispersing agents such as starch, methylated starch, gum arabic, finely divided magnesium carbonate, polyvinyl alcohol, and the like. Mixtures of emulsifying and dispersing agent can be used. Stirring, shaking or tumbling of the polymerization mixture during the polymerization reaction gives improved product and yield.

The new monomers of the invention readily copolymerize with one or more other polymerizable unsaturated compounds containing a single ethylenic unsaturation, i. e., containing the basic group $CH_2=C<$, to give high molecular weight resinous polymers, for example, one or more of any of the new monomers with one or more unsaturated compounds from the group including vinyl esters of carboxylic acids (e. g. vinyl acetate, vinyl propionate, vinyl butyrate, vinyl stearate, vinyl trifluoroacetate, vinyl benzoate, etc.), vinyl alkyl ketones (e. g. methyl vinyl ketone, ethyl vinyl ketone, etc.), vinyl alkyl ethers (e. g. methyl vinyl ether, butyl vinyl ether, etc.), vinyl sulfonamides (e. g. vinyl sulfonamide, N-methyl vinyl sulfonamide, etc.), vinyl halides (e. g. vinyl chloride, vinyl bromide, vinyl fluoride), vinylidene halides (e. g. vinylidene dichloride, vinylidene dibromide, vinylidene chloride-bromide, vinylidene difluoride, etc.), vinyl urethanes (e. g. vinyl methyl urethane, vinyl ethyl urethane, etc.), cyclic vinyl imides (e. g. vinyl succinimide, vinyl phthalimide, etc.), acrylic amide, N-alkyl amides, nitrile and methyl, ethyl, butyl, benzyl, phenyl, etc. esters and the corresponding methacrylic acid derivaties. The proportions of the components in the copolymers can vary from 5 to 95 parts by weight of one or more of the new fluoroalkyl vinyl sulfonates and from 95 to 5 parts by weight of one or more of the above mentioned other unsaturated monomers. In general, the copolymeric products contain the same proportions of components as was contained in the starting polymerization mixtures.

The following examples will serve to illustrate further our new fluoroalkyl vinyl sulfonates, polymers thereof, and the manner of preparing the same.

*Example 1*

To a solution of 12.6 g. (0.1 mol) of ethylenesulfonyl chloride in 60 cc. of benzene, there was added dropwise with stirring and cooling, a solution of 10.0 g. (0.10 mol) of 2,2,2-trifluoroethanol in 7.9 g. (0.10 mol) of pyridine. The mixture was stirred for 30 minutes and filtered. Benzene was removed by distillation. Hydroquinone, 0.01 g., was then added and the 2,2,2-trifluoroethyl vinyl sulfonate was separated by fractional distillation. It had a boiling point of 101°–103° C./15 mm. and is a clear colorless liquid.

In place of the 2,2,2-trifluoroethanol in the above example, there can be substituted an equivalent amount of 2,2-difluoroethanol to give the corresponding product, 2,2-difluoroethyl vinyl sulfonate, of generally similar properties.

*Example 2*

To a solution of 12.6 g. of ethylenesulfonyl chloride in 60 cc. of dry dioxane, there was added with stirring and cooling, a solution of 11.4 g. of 3,3,3-trifluoropropanol in 7.9 g. of pyridine. The pyridine hydrochloride which precipitated was removed by filtration. Then 0.01 g. of hydroquinone was added and the 3,3,3-trifluoropropyl vinyl sulfonate was separated by fractional distillation of the reaction mixture. The product had a boiling point of 109°–112° C./15 mm. and is a clear colorless liquid.

In place of the 3,3,3-trifluoropropanol in the above example, there can be substituted an equivalent amount of 3,3-difluoropropanol to give the corresponding product, 3,3-difluoropropyl vinyl sulfonate, of generally similar properties.

*Example 3*

12.6 g. of ethylenesulfonyl chloride in 60 cc. of benzene was reacted with 9.6 g. of 2,2-difluoropropanol in 7.9 g. of pyridine. The mixture was stirred and filtered. The benzene was removed by distillation. Then 0.01 g. of hydroquinone was added and the reaction residue fractionally distilled to give a good yield of 2,2-difluoropropyl vinyl sulfonate, B. P. 114°–117° C./15 mm. The 2,2-difluoropropyl vinyl sulfonate is a colorless liquid.

*Example 4*

10 g. of trifluoroethyl vinyl sulfonate and 0.1 g. of acetyl peroxide were heated together in a sealed tube at 40° C. for a period of 24 hours. The resinous homopolymer obtained was a hard, clear, moldable polymer. It was insoluble in water, but soluble in acetone and in acetonitrile. The polymer has a softening point above 140° C.

*Example 5*

10 g. of 3,3,3-trifluoropropyl vinyl sulfonate and 0.2 g. of benzoyl peroxide were heated at 80° C. for 24 hours. The resinous homopolymer obtained was a hard, clear, moldable polymer. It was insoluble in water, but soluble in acetone. The polymer has a softening point above 150° C.

*Example 6*

10 g. of 2,2-difluoropropyl vinyl sulfonate and 0.2 g. of benzoyl peroxide were heated at 80° C. for 24 hours. The resinous homopolymer obtained was a hard, clear, moldable polymer. It was insoluble in water, but soluble in acetone. The polymer has a softening point above 130° C.

*Example 7*

1 g. of 2,2,2-trifluoroethyl vinyl sulfonate, 9 g. of styrene and 0.1 g. of 30 per cent acetyl peroxide in dimethyl phthalate were heated together at 60° C. in an atmosphere of nitrogen. The resinous copolymer obtained was a hard, clear, moldable polymer. It contained approximately 10 per cent by weight of trifluoroalkyl vinyl sulfonate and 90 per cent by weight of styrene, and was soluble in benzene and had improved flame resistance over pure polystyrene.

*Example 8*

8 g. of 3,3,3-trifluoropropyl vinyl sulfonate and 2 g. of methyl methacrylate were heated together at 60° C., in an atmosphere of nitrogen, using 0.5 per cent of benzoyl peroxide as a catalyst. The resinous copolymer contained approximately 80 per cent by weight of trifluoropropyl vinyl sulfonate and 20 per cent by weight of methyl methacrylate. It was a hard, clear, moldable polymer and soluble in acetone, methylethyl ketone and similar ketonic solvents.

*Example 9*

2 g. of 2,2-difluoropropyl vinyl sulfonate, 8 g. of acrylonitrile, 0.1 cc. of 10 per cent hydrogen peroxide, 1 cc. of aqueous 6 normal sulfuric acid and 0.2 g. of ferrous sulfate were added with stirring to 90 cc. of distilled water. The polymerization started immediately at room temperature and was complete within several hours. The resinous copolymer contained approximately 20 per cent by weight of 2,2-difluoropropyl vinyl sulfonate and 80 per cent by weight of acrylonitrile. It was a tough, clear polymer soluble in dimethyl acetamide, from which solutions it was spinnable to fibers characterized by good physical and chemical properties and high flame resistance. The fibers have a softening point above 200° C.

*Example 10*

5 g. of 2,2,2-trifluoroethyl vinyl sulfonate and 10 g. of vinyl chloride were emulsified in 50 cc. of water using 0.5 g. of polyvinyl alcohol as an emulsifying or dispersing agent and polymerized at 60°–70° C. using ammonium persulfate as a polymerization catalyst. After about 15 hours, acetic acid was added to the mixture and the white precipitate of polymer was filtered off, washed with water, then with alcohol and dried. The polymer was soluble in cyclohexanone from which solution it gave on coating or spinning excellent films and fibers.

*Example 11*

8 g. of 2,2-difluoropropyl vinyl sulfonate and 2 g. of methyl α-chloroacrylate were heated together at 60° C., in an atmosphere of nitrogen, using 0.5 per cent of hydrogen peroxide as a polymerization catalyst. The hard, clear, moldable resinous copolymer obtained contained approximately 80% by weight of 2,2-difluoropropyl vinyl sulfonate and 20 per cent by weight of methyl α-chloroacrylate. It was soluble in acetone, methylethyl ketone and cyclohexanone.

In place of the methyl α-chloroacrylate in the above example, there can be substituted a like amount of methyl acrylate, butyl methacrylate or β-cyanoethyl acrylate to give generally similar moldable copolymers.

By proceeding as set forth in the above examples, other homopolymers and copolymers of the new fluoroalkyl vinyl sulfonates of the invention can be prepared. For example, by simply altering the proportions of components in the copolymerization mixtures, resinous copolymers can be prepared which contain any proportion by weight of one or more of the fluoroalkyl vinyl sulfonates of the invention within the 5 to 95 parts by weight specified range. In addition to the mentioned uses, the polymers of the invention can also be coated from their solutions or dopes, which may or may not have added materials incorporated therein such as fillers, dyes, plasticisers, etc., into films and sheet materials which are characterized by being tough and flexible and flame resistant.

What we claim is:

1. A fluoroalkyl vinyl sulfonate having the general formula:

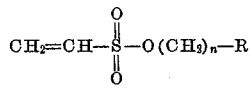

wherein $n$ represents a whole number of from 1 to 2, and R represents a member selected from the group consisting of a —$CHF_2$ group, a —$CF_3$ group and a —$CF_2$—$CH_3$ group.

2. 2,2-difluoroethyl vinyl sulfonate.
3. 2,2,2-trifluoroethyl vinyl sulfonate.
4. 2,2-difluoropropyl vinyl sulfonate.
5. 3,3-difluoropropyl vinyl sulfonate.
6. 3,3,3-trifluoropropyl vinyl sulfonate.
7. A resinous polymer of a fluoroalkyl vinyl sulfonate having the general formula:

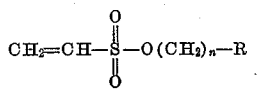

wherein $n$ represents a whole number of from 1 to 2, and R represents a member selected from the group consisting of a —$CHF_2$ group, a —$CF_3$ group and a —$CF_2$—$CH_3$ group.

8. A resinous copolymer of from 5 to 95 parts by weight of 2,2,2-trifluoroethyl vinyl sulfonate and from 95 to 5 parts by weight of styrene.

9. A resinous copolymer of from 5 to 95 parts by weight of 3,3,3-trifluoropropyl vinyl sulfonate and from 95 to 5 parts by weight of methyl methacrylate.

10. A resinous copolymer of from 5 to 95 parts by weight of 2,2-difluoropropyl vinyl sulfonate and from 95 to 5 parts by weight of acrylonitrile.

11. A resinous copolymer of from 5 to 95 parts by weight of 2,2,2-trifluoroethyl vinyl sulfonate and from 95 to 5 parts by weight of vinyl chloride.

12. A resinous copolymer of from 5 to 95 parts by weight of 2,2-difluoropropyl vinyl sulfonate and from 95 to 5 parts by weight of methyl α-chloroacrylate.

References Cited in the file of this patent

UNITED STATES PATENTS

| | | |
|---|---|---|
| 2,428,755 | Linn | Oct. 7, 1947 |
| 2,653,973 | Hedrick | Sept. 29, 1953 |

OTHER REFERENCES

Dickey: Abstract of Ser. No. 654,526, 630 O. G. 1065, Jan. 24, 1950.